United States Patent [19]

Bruinsma

[11] 3,737,564

[45] June 5, 1973

[54] CONTROL CIRCUIT FOR VARYING AND FOR COLOR AND BLACK-AND-WHITE GRADATIONS IN COLOR AND MONOCHROME TELEVISION

[75] Inventor: Anne Hendrik Bruinsma, Emmasingel, Eindhoven, Netherlands

[73] Assignee: U.S. Philips Corporation, New York, N.Y.

[22] Filed: Mar. 17, 1971

[21] Appl. No.: 125,136

[30] Foreign Application Priority Data

Mar. 25, 1970 Netherlands ........................7004340

Jan. 26, 1971 Netherlands ........................7100973

[52] U.S. Cl. ..............................178/5.4 R, 178/5.2 A

[51] Int. Cl. ..............................H04n 9/12

[58] Field of Search ..........................178/5.2 A, 5.2 R, 178/5.4 R, 7.2

[56] References Cited

UNITED STATES PATENTS

| | | | |
|---|---|---|---|
| 2,799,722 | 8/1957 | Neugebauer | 178/5.2 A |
| 2,982,814 | 5/1961 | Fine et al | 178/6.8 |
| 3,255,305 | 6/1966 | Chatten | 178/5.4 MA |

*Primary Examiner*—Richard Murray

*Attorney*—Frank R. Trifari and Henry I. Steckler

[57] ABSTRACT

A control circuit for varying colors and for colors and black-and-white gradations in color and monochrome television, particularly for color television in which in a reproduction of the picked-up scene having certain colored parts or regions, differently colored regions may be adjusted optionally. When a chrominance signal exceeds a threshold level, clamping pulses are derived from each of the three channels. The clamping pulses of each channel are applied to all three video channels for black level introduction. Subsequently, a plurality of gated level control circuits follow in each video channel which circuits are divided into groups of three in these channels. Each group of gated level control circuits divided in the three channels is activated in cooperation with the clamping pulses which are derived from one or more video channels so as to introduce optionally color information.

10 Claims, 4 Drawing Figures

Figure 1:
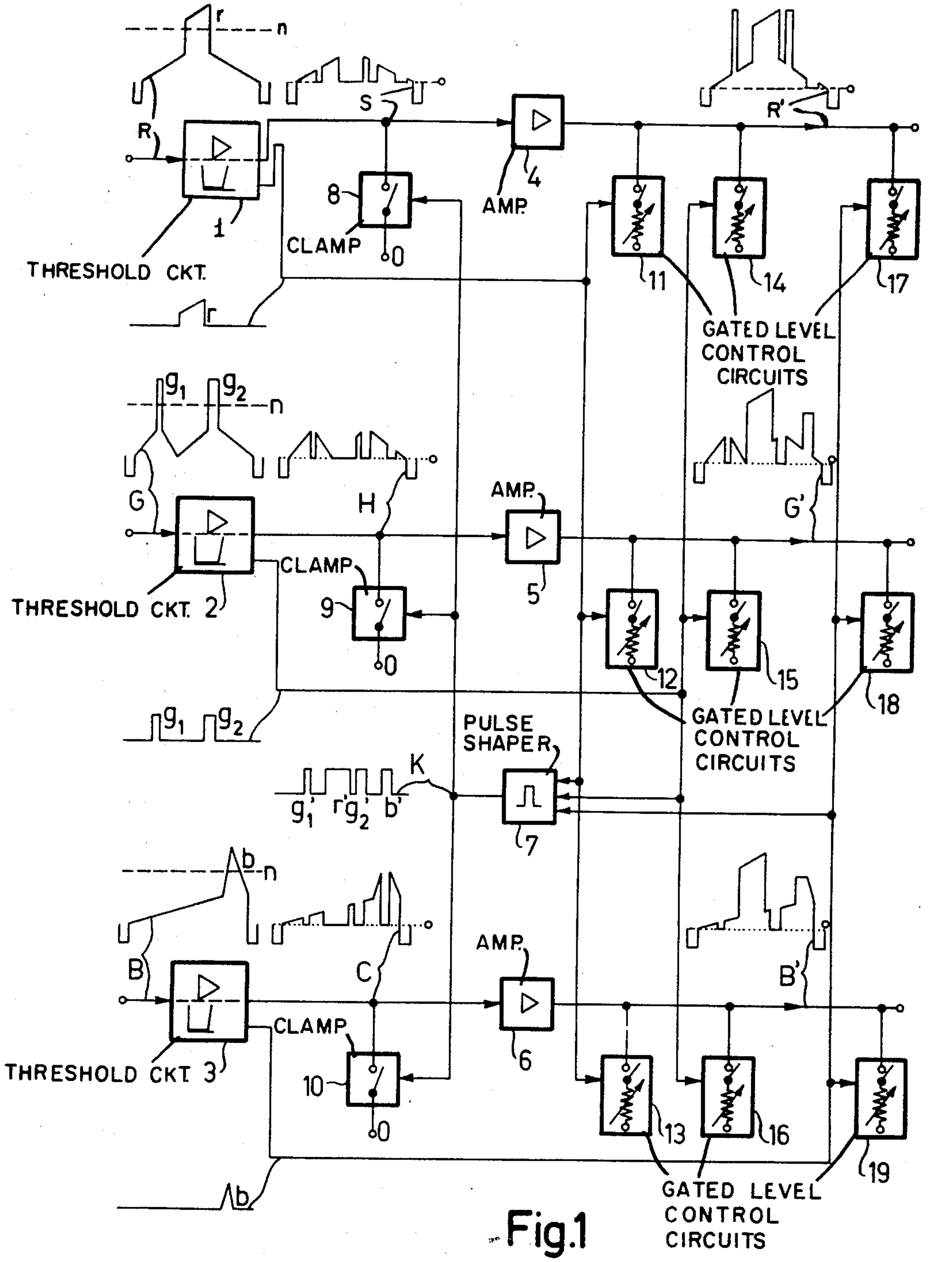

INVENTOR.
ANNE H. BRUINSMA
BY
AGENT

INVENTOR.
ANNE H. BRUINSMA

BY [signature]
AGENT

INVENTOR.
ANNE H. BRUINSMA
BY
AGENT

INVENTOR.
ANNE H. BRUINSMA
BY Frank R. Trifari
AGENT

CONTROL CIRCUIT FOR VARYING AND FOR COLOR AND BLACK-AND-WHITE GRADATIONS IN COLOR AND MONOCHROME TELEVISION

The invention relates to a control circuit for varying colors and for color and black-and-white gradations in color and monochrome television, which control circuit is formed with at least two video channels.

For monochrome television the video signals of the channels may originate from one and the same television camera or from different television cameras with which one and the same scene or a different scene is picked up. In the control circuit the two or more video signals are combined to form one signal to be applied to one television display tube. The grey hues in the displayed composite image may be controlled by controlling the two or more video signals separately or in combination. In case of separate control, mutual influence of the two images is to be prevented.

In color television three video channels denoted as chrominance channels may occur which are associated with one color television camera. In the camera the light coming form a scene to be picked up is split up in, for example, three colors and is converted into three chrominance signals which provide a colored reproduction of the scene when they are applied to a color television display tube. For obtaining a reliable reproduction of a scene the chrominance signals are normally applied to matrix circuits so as to determine certain prescribed mutual proportions. These proportions prescribed for the reliable reproduction generally render a color control circuit superfluous and undesirable. However, if a color control circuit is desirable by which the color of certain portions of the reproduced scene could be varied optionally, the mutual proportions between the chrominance signals and their mutual influences create problems.

An object of the present invention is to provide a simple grey hue control circuit and a color control circuit by which optionally and arbitrarily the hue or color of certain portions of a picked-up scene can be varied into a different hue or color. To this end a control circuit according to the invention is characterized in that at least one video channel is formed with a threshold device for separating video signal portions exceeding a threshold level, which threshold device is connected for the purpose of control to a common clamping circuit for instantaneously determining a reference level in each channel, while the said threshold device is furthermore connected for the purpose of control to gated level control circuits provided in each video channel and following the common clamping circuit.

Furthermore, a control circuit according to the invention is characterized in that the video channels are each formed with a threshold device for separating video signal portions exceeding a threshold level, which threshold devices are jointly connected for the purpose of control to one common clamping circuit for instantaneously determining a reference level in each channel, while the said threshold devices are individually connected for the purpose of control to one of the gated level control circuits provided in each video channel and following the common clamping circuit.

Figure 2:
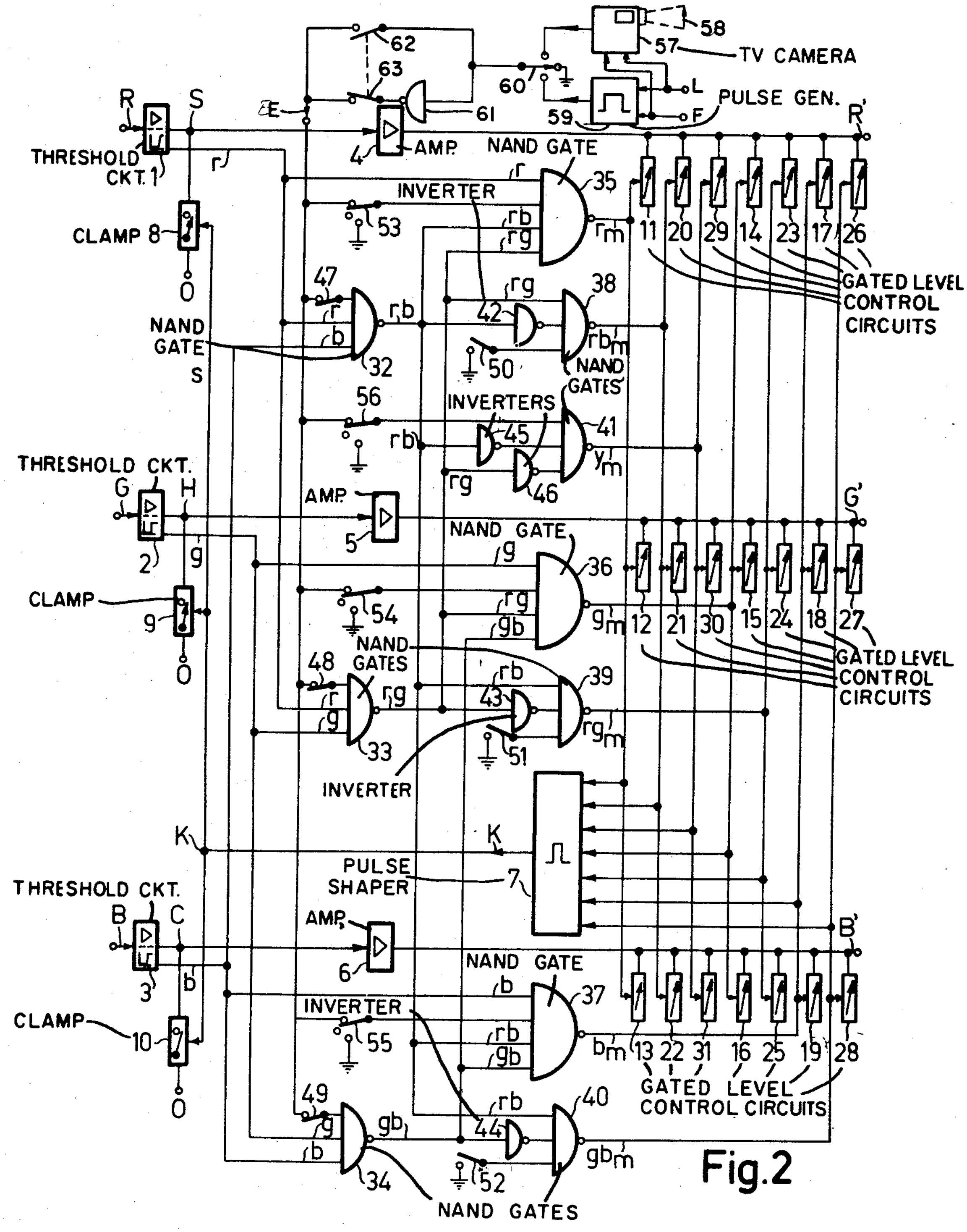
Figure 3:
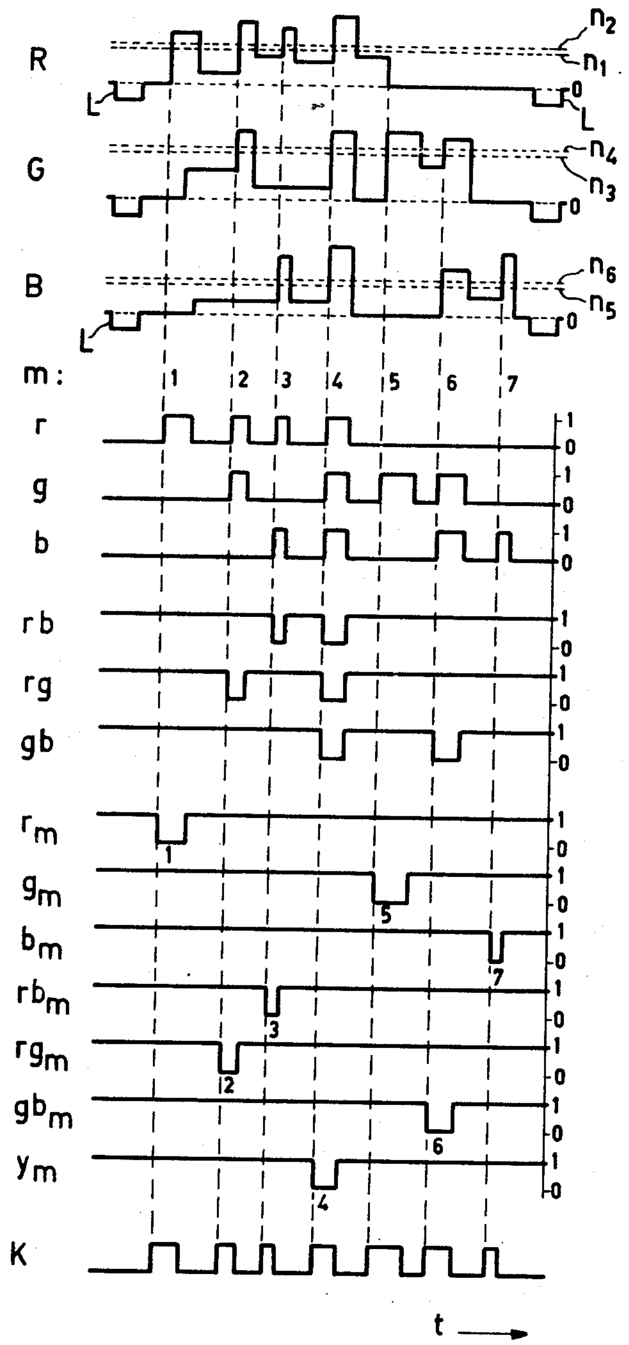
Figure 4:
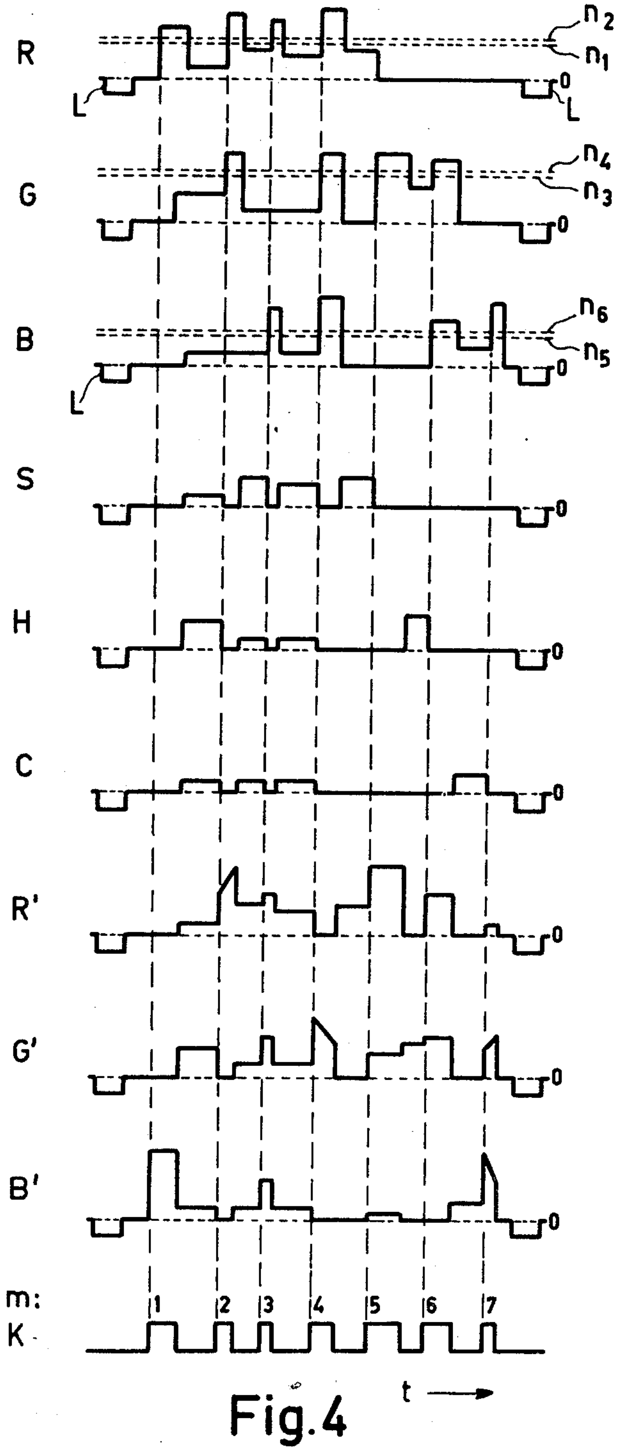

In order that the invention may be readily carried into effect, some embodiments thereof will now be described in detail, by way of example with reference to the accompanying diagrammatic drawings, in which:

FIG. 1 shows a first embodiment of a color control circuit according to the invention, and the signals occurring therein, FIG. 2 shows a second embodiment, FIG. 3 shows as a function of time some signals and auxiliary signals associated with FIG. 2 and FIG. 4, likewise as FIG. 3, shows some further signals.

FIG. 1 shows a control circuit according to the invention, suitable for color television. The control circuit is formed with three video channels at the inputs of which some video or chrominance signals R, G and B are shown diagrammatically. The chrominance signals R, G and B correspond to the red, green and blue light components in the light coming from a scene which is picked up by a television camera. The chrominance signals R, G and B shown over approximately one line period including two line synchronizing pulses are applied to threshold devices 1, 2 and 3, respectively. A threshold device 1, 2 or 3 has two outputs one of which conveys, without further steps to be described hereinafter, a possibly amplified signal corresponding to the supplied chrominance signals R, G or B, and would apply this signal to an amplifier or separator stage 4, 5 or 6. The other outputs of the threshold devices 1, 2 and 3 only convey a signal when signal portions in the chrominance signals R, G and B exceed a threshold level denoted by $n$. In the chrominance signal R the reference $r$ denotes a signal portion exceeding the threshold level $n$ which portion appears as a signal $r$ at the threshold output of the threshold device 1. Correspondingly, the chrominance signals G and B have two signal portions $g_1$ and $g_2$ and one signal portion $b$, respectively, which occur as signals $g_1$, $g_2$ and $b$ at the threshold outputs of the devices 2 and 3. The threshold levels $n$ assumed to be equal in the signals R, G and B may alternatively be located differently.

The threshold outputs of the threshold devices 1, 2 and 3 are connected to inputs of a pulse shaper 7. An output of the pulse shaper 7 conveying a signal K is connected to the inputs of three clamping circuit 8, 9 and 10 which are arranged between the first-mentioned output or amplifier output of the threshold devices 1, 2 and 3 and a terminal conveying a reference level 0. The pulse shaper 7 and the circuits 8, 9 and 10 constitute a common quick-acting clamping circuit (7–10) for the three video channels with the signals R, G and B. Under the influence of the signals $r$; $g_1$, $g_2$ and $b$ successive clamping pulses $g'_1$, $r'$, $g'_2$ and $b'$ occur in the signal K, which pulses activate the circuits 8, 9 and 10. As a result the amplifier outputs of the threshold devices 1, 2 and 3 convey the signals S, H and C instead of the signals R, G and B. The reference level 0 is shown in the signals S, H and C occurring in the video channels including the amplifier or separator stages 4, 5 and 6. The reference level 0 is considered to coincide with the black level in the chrominance signals R, G and B.

The threshold output of the threshold device 1 conveying the signal $r$ is connected for the purpose of control to the input of three gated level control circuits 11, 12 and 13 which are coupled to the outputs of the amplifier or separator stage 4, 5 or 6 in the three video channels. Correspondingly the output of the threshold device 2 conveying the signal $g_1$, $g_2$ is connected to three gated circuits 14, 15 and 16 likewise arranged and the output of the device 3 conveying the signal $b$ is connected to three gated circuits 17, 18 and 19.

The gated level control circuits 11 . . . 19 are diagrammatically shown by means of a switch and a variable resistor in series. The signal $r$; $g_1$, $g_2$ or $b$ has an action that closes the switch and may have an action that varies the variable resistor. The resistor may also be formed in an adjustable manner. The adjustable and/or variable resistor symbolically denotes the level control circuit. For a simple practical embodiment of a gated level control circuit 11 . . . 19 reference is made to a controlled transistor which is switched on and switched off and which optionally may be saturated for an amplitude limiting influence.

Under the influence of the gated circuits 11, 14, 17; 12, 15, 18 and 13, 16, 19 the signals S, H and C are converted into signals R', G' and B' in the video channels which signals occur as output signals of the control circuit according to FIG. 1.

The operation of the control circuit follows from a comparison of the signals R, G, B; S, H, C and R', G', B'. The chrominance signals R, G and B shown over approximately one line period and being, for example, the same for a complete picture period or two field periods, then represent a picked-up scene having a more or less red-colored, vertical, very broad bar ($r$ in chrominance signal R) on either side of which a more or less green colored narrow bar ($g_1$ in chrominance signal G) and a broad bar ($g_2$) are present, followed by a more or less blue-colored bar ($b$ in chrominance signal B). The more or less red, green and blue is used to emphasize that this color is predominant in the said bars relative to the other colors present. Not only are all mentioned color bars removed from the chrominance signals R, G and B with the aid of the common clamping circuit (7 – 10), but also the information which is locally present in the other chrominance signals so that the signals S, H and C occur.

For the video channel with the signal R' there follows that the signal $r$ restores the information in the chrominance signal R occurring during the pulse period ($r$) to the supplied value in the signal R' with the aid of the gated level control circuit 11. The gated level control circuit 14 is controlled during the period of the pulses $g_1$ and $g_2$ in the signal $g_1$, $g_2$ in such a manner that the maximum supplied value also occurs in the signal R'. By selecting the bias in circuit 17 the operator can choose that the signal $b$ does not activate the gated circuit 17 or, that it does activate it and when it is activated, the signal R' maintains the reference or black level 0.

In the signals G' and B' there is shown that the black level 0 therein is maintained during the pulses $g_1$ and $g_2$ in the signal $g_1$, $g_2$. The gated circuits 15 and 16 then do not cause any variation in the signals H and C. When reproducing the signals R', G' and B', the result is that the more or less green-colored bars $g_1$ and $g_2$ in signals G during picking up have changed into vivid red bars.

The signal $b$ provides the same signal value in the signals G' and B' through the gated level control circuits 18 and 19, so that upon display a blue-green bar (cyan) instead of the more or less blue-colored bar in the picked-up scene appears due to the presence of an equal green and blue color component.

The signal $r$ provides information in the signals H and C through the gated level control circuits 12 and 13 which during the pulse period in the signal $r$ results in the signal portions shown in the signals G' and B', which portions are equal to those in signal R'. The result upon display is that the more or less red-colored bar of the picked-up scene has changed to a white-colored bar ($R = G = B$).

It is found that upon display a scene having certain color regions is converted with the aid of the control circuit according to the invention into an image of the scene having differently colored regions. The color may be changed optionally. Such a color control circuit is of great importance for designers of new products whose attractiveness is determined or increased by a combination of colored regions. By observing several color regions of a prototype through a color television camera, a control circuit according to the invention and normally used signal handling circuits on a color monitor, any color combination may be considered for its efficiency with the aid of the color control circuit. As compared with the time consuming painting of a product and experimentation with the different combinations a large gain in time and saving of cost is the result.

In case of bright, more or less saturated color regions with the colors red, green or blue, information only occurs for such a color region in one video signal with a chrominance signal R, G or B, while the black level is more or less present in the two other channels, It will be evident that there is less need to bring the signals in the other said channels at the black level.

In the presence of, for example, a blue-green region in a picked-up scene, the threshold level $n$ may be exceeded for this range in both video channels with the signals G and B. This does not become manifest in the signals H and C, but is only found from the simultaneous occurrence of pulses in the signals ($g_1$, $g_2$) and $b$. As a result, the gated level control circuits 14, 17; 15, 18 and 16, 19 are simultaneously active for the said region.

The gated level control circuits 11 . . . 19 may be coupled in three groups 11, 12, 13; 14, 15, 16 and 17, 18, 19. It may be achieved by such a coupling that a desired further increase of the level in, for example, the signal G' coincide with a decrease in the signal B' when the pulse occurs in the signal $b$. The coupling of the gated level control circuits 18 and 19 may then be such that an adjustment of the control in the circuit 18 further than an admitted maximum value does not further influence the circuit 18, but only acts on the circuit 19. In this manner a signal-limiting action may be obtained in the signals R', G' and B'.

For monochrome television the control circuit may be formed with two or more video channels which are connected to the same or to other video signal sources. When using one and the same video signal source, it may be achieved in two video channels by using two different threshold levels in the threshold devices that certain white or grey tinted regions can be controlled in their hue independently of each other by the two gated level control circuits which are controllable independently of each other, and which follow the clamping circuit in each video channel.

When using different video signal sources, it is achieved that grey control is possible in a partial image corresponding to a video channel and that the partial image of another video channel cannot be seen through the grey colors by using the common clamping circuit and by subsequently introducing information in an independent manner into the video channel with the aid of the gated level control circuits.

In the simplest embodiment of the control circuit using two video channels only one video channel is provided with a threshold device, for example, the threshold device 1 which is connected at one end to one common clamping circuit, for example, (7, 8, 9) for both channels and which is connected at the other end to gated level control circuits, for example, 11 and 12 occurring in each channel. The other video channel is then formed with the clamping circuit 9 and the gated level control circuit 12 is formed without the components 2, 15 and 18 shown in the Figure.

In case of simultaneous display on a monochrome or color television receiver or monitor it is achieved that the information separated by the threshold device 1 in the combined picture may be introduced again into both channels optionally and varied independently of each other.

A further embodiment includes a third video channel and only the clamping circuit 10 and the gated level control circuit 13. In this case the three input terminals of the control circuit may be interconnected and may be connected to one single signal source while the three separated output terminals are connected to the red, green and blue chrominance signal input terminals of a color television monitor. As a result it is achieved that the information provided by the single signal source and separated by the threshold device 1 can be separately introduced optionally into each chrominance channel. Without the control circuit the single signal source would display a black-and-white image on the display screen of the color television monitor, because *R=G=B*. It is achieved with the control circuit that in the original black-and-white image the signal portions separated by the threshold device 1 may be given any color upon display with the aid of the gated level control circuits 11, 12 and 13, because R, G and B are rendered unequal. A black-and-white camera and color television display system using a black-and-white camera and a color monitor is the result. A difference in brightness in the black-and-white image may be given a certain color.

FIG. 2 shows an embodiment of the color control circuit with which also regions of mixed colors composed of red, green and blue primary colors R, G and B may be changed in color optionally and without influencing differently colored regions.

Components of the color control circuit already denoted in FIG. 1 have the same reference numerals in FIG. 2. FIGS. 3 and 4 diagrammatically show some signals as Examples associated with FIG. 2. In the chrominance signals R, G and B the reference L denotes several line synchronizing pulses while three threshold levels are denoted by $n_1$, $n_3$ and $n_5$. The devices 1, 2 and 3 are formed as a threshold device including a limiter whose limiting level is denoted by $n_2$, $n_4$ and $n_6$.

Gates which will be further denoted and described hereinafter are provided between the threshold outputs of the threshold devices 1, 2 and 3 with the signals *r*, *g* and *b* of FIG. 3, including the values exceeding the threshold levels as pulses, the pulse shaper 7 and a more extensive number of gated level control circuits than 11 to 19. The output of the stage 4 providing the signal S which is either amplified or not is connected to the outputs of a plurality of gated level control circuits denoted by the reference numerals 11, 14, 17, 20, 23, 26 and 29. Likewise the output of the stage 5 is connected to the outputs of gated level control circuits 12, 15, 18, 21, 24, 27 and 30 and that of stage 6 is connected to the outputs of 13, 16, 19, 22, 25, 28 and 31. The inputs of the gated level control circuits 11 to 31 are interconnected in seven groups of three each such as the groups 11, 12, 13; 14, 15, 16; . . . 29, 30, 31, and are connected to inputs of the pulse shaper 7.

Under the influence of the gated level control circuits 11, 14 . . . 19; 12, 15 . . . 30 and 13, 16 . . . 31 the signals R, G and B are converted through the signals S, H and C into the signals R′, G′ and B′, which conversion is shown in FIG. 4.

To explain its operation, the control circuit according to FIG. 2 is described in greater detail in connection with the signals of FIGS. 3 and 4. A signal E denoted at a terminal but further not shown is applied to said terminal, which signal serves directly or indirectly as a release or blocking signal for a plurality of NAND gates 32 to 41. Furthermore, a plurality of signal inverters 42 to 46, on-off switches 47 to 52 and three-position switches 53 to 56 are shown. The assembly is interconnected as follows and is connected between the threshold outputs of the threshold devices 1, 2 and 3 and the inputs of the gated level control circuits 11 to 31:

Inputs of the NAND gate 32 are connected to outputs of the threshold devices 1 (signal *r*) and 3 (signal *b*) in which the signal E is applied through on-off switch 47. Likewise there applies for gate 33 threshold devices 1(*r*) and 2 (*g*), switch 48 and for gate 34: threshold devices 2 (*g*) and 3(*b*), switch 49.

Inputs of the NAND gate 35 are connected to the outputs of the threshold device 1 (signal *r*) and the gates 32 (signal *rb*) and 33 (signal *rg*) in which the signal E is applied through the three-position switch 53 whose switching limb may be free or may be connected to ground. The output of the gate 35 (signal $r_m$) is connected to the inputs of the gated level control circuits 11, 12 and 13. Likewise there applies for gate 36: threshold device 2(*g*), gates 33 (*rg*) and 34 (*gb*), E through switch 54. The output of gate 36 (signal $g_m$) is connected to 14, 15 and 16. For gate 37 there applies: threshold device 3(*b*), gates 32 (*rb*) and 34 (*gb*), E through switch 55. The output of gate 37 (signal $b_m$) is connected to 17, 18 and 19.

Inputs of the NAND gate 38 are connected to the gate 33 (signal *rg*), to the on-off switch 50 to ground and through inverter 42 to the gate 32 (signal *rb*). The output of the gate 38 (signal $rb_m$) is connected to the inputs of the gated level control circuits 20, 21 and 22. Likewise there applies for gate 39: gate 32 (*rb*), switch 51 and through inverter 43 connected to gate 33 (*rg*). The output of gate 39 (signal $rg_m$) is connected to 23, 24 and 25. For gate 40 there applies: gate 32 (*rb*), switch 52 and through inverter 44 connected to gate 34 (*gb*). The output of gate 40 (signal $gb_m$) is connected to 26, 27 and 28.

Inputs of the NAND-gate 41 are connected through inverter 45 to gate 32 (signal *rb*), through inverter 46 to gate 33 (signal *rg*) and through three-position switch 56 the signal E is applied, the two other positions being: free or connected to ground. The output of the gate 41 (signal $y_m$) is connected to the inputs of the gated level control circuits 29, 30 and 31.

Generally there applies for a NAND gate that it only supplies a logical 0 if a logical 1 occurs at all inputs. A free input conveys the logical 1 due to internal couplings, while ground represents the logical 0 in this case. When an information signal and gating signals are applied to a NAND-gate, the result is that the information signal conveying the logical 1 is passed on inverted as a logical 0 if all gating signals have the logical 1. In case of a logical 1 at the output of the NAND-gate this gate is blocked so that a logical 0 occurs at one or more inputs. The gates may be denoted as coincidence gates.

It is assumed that the signal E is active as a release signal and has the logical 1 while all inputs of the gates 35 to 41 are free from ground.

FIG. 3 shows that a total of seven individual or simultaneous values of exceeding the threshold levels $n_1$, $n_3$ and $n_5$ occur in the signals R, G and B, which are denoted by $m$ : 1, 2 . . . 7. For the sake of simplicity the exceeding values are assumed to the bars occurring upon display which are vertically arranged, thus of $m$ possible bars seven are shown. The following Table gives a survey of the exceeding values of the thresholds and the presence or absence of the primary colors R, G and B without exceeding the thresholds.

TABLE

| Bars $m$ | Exceeding | Present | Absent |
|---|---|---|---|
| 1 | R | G | GG B |
| 2 | R | B | |
| 3 | R B | G | |
| 4 | R G B | | |
| 5 | G | | R B |
| 6 | G B | | R |
| 7 | B | | R G |

In correspondence to the Table the signals $r$, $g$ and $b$ provided by the threshold devices 1, 2 and 3 of FIG. 2 are shown in FIG. 3. For these signals and following signals a logical 1 and 0 are plotted. For the bar 1 there applies that the primary color G is present tberein over a portion thereof.

The NAND-gate 32 only produces a logical 0 in the signal $rb$, if the logical 1 occurs in both signals $r$ and $b$ applied thereto, which happens for the bars 3 and 4. Likewise the gate 33 only supplies the logical 0 in the signal $rg$ at the bars 2 and 4. Gate 34 only supplies the logical 0 in the signal $gb$ at the bars 4 and 6. The gates 32, 33 and 34 are active as coincidence pass-on gates.

The NAND gate 35 is to supply only the logical 0 if only the (red) threshold level $n_1$ is exceeded in a bar. To this end, the signals $rb$ and $rg$ are applied to the gate 35 with a blocking action (logical 0) so that only the first pulse in the signal $r$ is passed on by the gate 35 as is shown for the signal $r_m$. The same applies to the gates 36 and 37, so that in the signal $g_m$ only the fifth pulse and in the signal $b_m$ only the seventh pulse is passed on. In this case it has been assumed that a logical 1 does not influence the gated level control circuits 11 to 31 but that a logical 0 provides the information.

The NAND gate 38 is only to provide the logical 0 if in a bar only the red and blue threshold levels $n_1$ and $n_5$ are exceeded. If the green threshold level $n_3$ were also exceeded, gate 38 must remain blocked. To this end, the signal $rg$ is applied with a blocking action (logical 0) to the gate 38 while the logical 0 in the signal $rb$ provides the logical 1 to the gate 38 through the inverter 42. Subsequently the third pulse appears in the signal $rb_m$ and the signal $rg$ at bar 4 maintains the gate 38 blocked. The same action occurs at the gate 39 while the second pulse appears in the signal $rg_m$ and the signal $rb$ at the bar 4 blocks the gate 39. Likewise only the sixth pulse appears in the signal $gb_m$ of gate 40.

The gates 35 to 40 remain blocked in case of coincidence of the applied pulses which occur inversely and may be considered as coincidence blocking gates.

The NAND gate 41 is provided for obtaining information on all three threshold levels $n_1$, $n_3$ and $n_5$ being exceeded. Only two of the three signals $rb$, $rg$ and $gb$ in inverted form need be applied to the gate 41 so as to obtain this information. Subsequently, the fourth pulse occurs in the signal $y_m$ provided by gate 41. The gate 41 is active as a coincidence pass-on gate.

All seven pulses occur in the signal K which pulses serve as clamping pulses for the clamping circuits 8, 9 and 10. The result is that the signals R, G and B shown in FIG. 4 are converted into the signals S, H and C in which the black level 0 is introduced during the occurrence of the seven bars, if this level is not present already.

As already described with reference to FIG. 1 any different or the same level may be introduced arbitrarily into each of the three chrominance channels with the aid of the groups of gated level control circuits 11, 12, 13; 14, 15, 16; . . . . 29, 30, 31, as is shown in FIG. 4 at the signals R', G' and B'.

The original (R,G,B) red/red-green (yellowish) bar 1 is rendered, for example blue upon display (R', G', B'). The yellowish bar 2 turns red and also shows a gradation. The red-blue or purplish bar 3 is rendered white because $R=G=B$. The bar 4 turns green with a decrease in gradation. The bright green bar 5 turns to a combination of the colors red, green and blue, as well as the bright blue bar 7. The green-blue bar 6 originally present in the scene turns yellow upon display.

The bars 2, 4 and 7 show a color gradation upon display, while evenly colored bars are used as a basis when picking up the scene. In this case the color gradation is generated by the gated level control circuit in question. To this end, the level control circuit may be formed, for example, with a current source charging or discharging a capacitor. If a color gradation is already present in the picked-up bars, it could be directly supplied from the threshold devices 1, 2 and 3 to the level control circuits in question in the digitalized embodiment employing the gates 32 to 41 and the inverters 42 to 46 so as to maintain this certain gradation but in a different color.

It has been assumed that the threshold devices 1, 2 and 3 each have a threshold level $n_1$, $n_3$ or $n_5$ and a limiting level $n_2$, $n_4$ or $n_6$. In the signals $r$, $g$ and $b$ pulses appear having equal pulse heights independent of the extent by which the threshold level $n_1$, $n_3$ or $n_5$ is exceeded. It would be alternatively possible to form the threshold devices 1, 2 and 3 in such a manner that a pulse only appears in the signals $r$, $g$ and $b$, when the signal value in the chrominance signals R, G and B lies between the levels $n_1$ and $n_2$, $n_3$ and $n_4$ or $n_5$ and $n_6$. A signal value lower than the level $n_1$, $n_3$ or $n_5$ or higher than $n_2$, $n_4$ or $n_6$ would then not be detected. In that case the threshold devices 1, 2 and 3 may have a plurality of outputs each having a different signal value separation. Since all mixed colors are built up from different, accurately determined combinations of the primary colors R, G and B, each combination, that is to say, the color could be detected with the aid of gates and could be changed in the manner described hereinbefore. The levels $n_1$ to $n_6$ could then be variable.

The level control circuits in the gated circuits 11 to 31 may be formed with signal oscillators which upon the display of a bar introduce a certain pattern therein. For example, a block signal generator which upon display of a bar introduces a striped pattern therein.

It may be desirable not to use the control circuit according to FIG. 2 for all seven colors but only for a selection therefrom. To this end the inputs of the NAND gates 35 to 41 may be connected to ground potential through switches 53, 54, 55, 50, 51 and 52 so that these gates remain blocked.

It may also be desirable to render the control circuit according to FIG. 2 active or not active only in a certain region of the scene picked up. The release or blocking signal E may be used for this purpose.

If it is desirable that the signal E does not influence some of the gates 32 to 41 at all, one or more of the on-off switches 47, 48 and 49 may be optionally opened and the three-position switches 53, 54, 55 and 56 may be set in their free position (logical 1).

The generation of the release or blocking signal E with the logical 1 or 0 may be effected both opto-electronically and only electronically with the aid of an additional release or blocking signal generator. For opto-electronical generation a television camera-57 may pick up, for example, a black-and-white object 58. The camera 57 generates a video signal in which, for example, white corresponds to the logical 1 and black to the logical 0. A pulse generator 59 may be used for the electronic generation. For the purpose of synchronization with the chrominance signals R, G and B, line synchronizing pulses L and field synchronizing pulses F derived therefrom are applied to the additional signal generator (57, 59). The output signal from the signal generator (57, 59) would yield a white or black image, for example, in the form of a rectangle upon display on a television monitor. The output signal from the television camera 57 or from the pulse generator 59 may be chosen with the aid of a three-position switch 60 as the output signal from the signal generator (57, 59) or the ground potential with the logical 0. The output of the switch 60 is directly connected or is connected through an inverter 61 to two coupled on-off-switches 62 and 63, respectively. The interconnected outputs of the switches 62 and 63 switching in phase opposition are connected to the terminal which conveys the signal E.

If the switch 60 is connected to ground, the inverter 61 and the switch 63 provide the logical 1 in the signal E which is active as a release signal. The signal E is active as a blocking signal when switch 62 is switched on. If a signal providing a white rectangle upon display (logical 1) is produced through the switch 60 by the television camera 57 or the pulse generator 59, the signal E is active as a release signal when the switch 62 is switched on, and as a blocking signal when the switch 63 is switched on.

The release and blocking signal generator (57, 59) may alternatively be used in the black-and-white camera and color television display system described. In this manner a desired region may be chosen for color introduction in the black-and-white image. Within the released region the brightness exceeding the threshold level leads to color introduction and beyond this region the control circuit is inoperative.

The release and blocking signal generator (57, 59) may alternatively form part of the television camera which provides the black-and-white signal and the chrominance signals R, G and B to the control circuit. A signal may be derived from the video signal provided by the camera, which signal shows the circumference of a part of the scene upon display. To make color variations of only this part possible, or to prevent these color variations, this derived (circumference) signal may serve as a release or blocking signal. In this manner a detailed selection from a multiple of details could be made.

I claim:

1. A circuit for varying the information content of at least two video channels, said circuit comprising at least one adjustable threshold circuit means coupled to one of said channels for supplying an output signal when a signal in said one channel exceeds a selectable level; a common clamp circuit means coupled to said threshold circuit and to each of said channels for clamping said channels to a black reference level when at least said one signal exceeds said threshold level, and at least two adjustable gated level control circuit means coupled to said channels respectively following said clamp circuit and to said clamp circuit for setting the amplitude of the signals in said channels to respective values upon an output from said clamp circuit; whereby said information content of the video signals in said channels is varied.

2. A circuit as claimed in claim 1 wherein each of said channels comprises a threshold circuit, all of said threshold circuits being coupled to said clamp circuit and individually coupled to said gated level control circuits respectively.

3. A circuit as claimed in claim 2 wherein each of said channels further comprises a coincidence passing gate having inputs coupled to said threshold circuits and an output coupled to the respective level control circuit.

4. A circuit as claimed in claim 3 further comprising a coincidence blocking gate having inputs coupled to said passing gate output and to one of said threshold circuits respectively and an output coupled to said level control circuits.

5. A circuit as claimed in claim 3 further comprising coincidence blocking and a further passing gate, each having an input coupled to outputs of said first recited passing gates respectively, said first recited passing gates outputs being coupled to said level control circuits respectively.

6. A circuit as claimed in claim 1 wherein said channels comprise first, second and third channels and are adapted to receive respective color television signals, said first, second and third channels comprising first, second and third threshold circuits respectively, each of said channels comprising first, second and third gated level control circuits coupled in said channels after said respective threshold circuits, each of said first, second and third control circuits being coupled to said first, second and third threshold circuits respectively.

7. A circuit as claimed in claim 1 wherein said channels comprise a single input adapted to receive a monochrome signal and three outputs adapted to be coupled to a color monitor, each of said channels comprising at least one gated level control circuit.

8. A circuit as claimed in claim 1 further comprising a gate having a first input coupled to said threshold circuit, a second input, and an output coupled to said level control circuit; and a control signal generator means coupled to said second input for enabling said gate.

9. A circuit as claimed in claim 8 wherein said gate comprises a third input, and further comprising a source of blocking potential and a switch coupled between said third input and said source.

10. A circuit as claimed in claim 1 further comprising means coupled to said level control circuits for effecting a mutual coupling therebetween wherein the control exercised by any one control circuit effects the amplitude settings of the other control circuits.

* * * * *